United States Patent
Klatt (10) Patent No.: US 10,917,763 B2
(45) Date of Patent: Feb. 9, 2021

(54) COMMUNICATION BETWEEN VEHICLE-MOUNTED COMMUNICATION EQUIPMENT OR A VEHICLE AND A PLURALITY OF ROADSIDE UNITS BY TRANSMITTING VEHICLE COMMUNICATION MESSAGES

(71) Applicant: Deutsche Telekom AG, Bonn (DE)

(72) Inventor: Axel Klatt, Cologne (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/950,195

(22) Filed: Apr. 11, 2018

(65) Prior Publication Data

US 2018/0302772 A1 Oct. 18, 2018

(30) Foreign Application Priority Data

Apr. 13, 2017 (EP) ..................................... 17166636

(51) Int. Cl.
*H04W 4/44* (2018.01)
*G07B 15/06* (2011.01)
(Continued)

(52) U.S. Cl.
CPC ............ *H04W 4/44* (2018.02); *G07B 15/063* (2013.01); *H04W 74/0816* (2013.01); *H04W 84/12* (2013.01)

(58) Field of Classification Search
None
See application file for complete search history.

(56) References Cited

U.S. PATENT DOCUMENTS

| 9,443,427 B1 * | 9/2016 | Bhuiya .................. G06Q 10/02 |
| 2008/0056495 A1 | 3/2008 | Eguchi et al. |

(Continued)

FOREIGN PATENT DOCUMENTS

| CN | 100372266 C | 9/2003 |
| JP | 2007157066 A | 6/2007 |

(Continued)

OTHER PUBLICATIONS

Anonymous, "Intelligent Transport Systems (ITS), Vehicular Communications, Basic Set of Applications, Part 2: Specification of Cooperative Awareness Basic Service:" *IEEE Draft* 802.11 ETSI ITS, v135: 1-45 (Jul. 21, 2014). XP68163402.

*Primary Examiner* — Mohammad S Adhami
(74) *Attorney, Agent, or Firm* — Leydig, Voit & Mayer, Ltd.

(57) ABSTRACT

A method of communication between vehicle-mounted communication equipment or a vehicle and a plurality of roadside units includes: in a first step, a first vehicle communication message is transmitted from a first roadside unit to the vehicle-mounted communication equipment or to the vehicle, wherein the first vehicle communication message contains a first piece of token information; and in a second step, which follows the first step, a second vehicle communication message is transmitted from the vehicle-mounted communication equipment or the vehicle to a second roadside unit, wherein the second vehicle communication message either comprises the first piece of token information or wherein the second vehicle communication message comprises a second piece of token information that is generated or modified by the vehicle-mounted communication equipment or in the vehicle on the basis of the first piece of token information received previously.

14 Claims, 1 Drawing Sheet

(51) Int. Cl.
*H04W 74/08* (2009.01)
*H04W 84/12* (2009.01)

(56) References Cited

U.S. PATENT DOCUMENTS

| | | | |
|---|---|---|---|
| 2011/0010228 A1* | 1/2011 | Goto | G07B 15/063 |
| | | | 705/13 |
| 2012/0094606 A1* | 4/2012 | Sakata | G08G 1/092 |
| | | | 455/66.1 |
| 2013/0328700 A1* | 12/2013 | Ibrahim | G08G 1/08 |
| | | | 340/907 |
| 2016/0169688 A1* | 6/2016 | Kweon | G08G 1/087 |
| | | | 701/522 |
| 2017/0195982 A1* | 7/2017 | Park | H04W 56/0015 |
| 2018/0020496 A1* | 1/2018 | Vanderveen | H04W 76/19 |
| 2018/0261018 A1* | 9/2018 | Reinold | G07B 15/063 |
| 2018/0279183 A1* | 9/2018 | Song | G01C 21/28 |

FOREIGN PATENT DOCUMENTS

| KR | 20040085357 A | 10/2004 |
|---|---|---|
| KR | 20050011419 A | 1/2005 |

\* cited by examiner

COMMUNICATION BETWEEN VEHICLE-MOUNTED COMMUNICATION EQUIPMENT OR A VEHICLE AND A PLURALITY OF ROADSIDE UNITS BY TRANSMITTING VEHICLE COMMUNICATION MESSAGES

CROSS-REFERENCE TO RELATED APPLICATIONS

Priority is claimed to European Patent Application No. EP 17 166 636.5, filed on Apr. 13, 2017, the entire disclosure of which is hereby incorporated by reference herein.

FIELD

The invention relates to a method of communication between vehicle-mounted communication equipment or a vehicle and a plurality of roadside units by transmitting vehicle communication messages between the vehicle-mounted communication equipment or the vehicle and the roadside units, wherein the plurality of roadside units comprises at least a first roadside unit and a second roadside unit.

The invention also relates to a system for communication between vehicle-mounted communication equipment or a vehicle and a plurality of roadside units by transmitting vehicle communication messages between the vehicle-mounted communication equipment or the vehicle and the roadside units, wherein the plurality of roadside units comprises at least a first roadside unit and a second roadside unit, and the system comprises at least the vehicle and the plurality of roadside units.

The invention also relates to a roadside unit for communication between vehicle-mounted communication equipment or a vehicle and a plurality of roadside units by transmitting vehicle communication messages between the vehicle-mounted communication equipment or the vehicle and the roadside units, wherein the roadside unit is suitable for use in the system according to the invention or in the method according to the invention.

The invention also relates to vehicle-mounted communication equipment for a vehicle for communication between the vehicle-mounted communication equipment and a plurality of roadside units by transmitting vehicle communication messages between the vehicle-mounted communication equipment and the roadside units, wherein the vehicle and/or the vehicle-mounted communication equipment of the vehicle is suitable for use in the system according to the invention or in the method according to the invention.

The invention also relates to a computer program comprising program code via which the steps of the method according to the invention can be carried out when the computer program is executed on a programmable device, in particular one that is part of the system, or on the vehicle or the vehicle-mounted communication equipment or on the roadside unit(s).

The invention also relates to a computer program product comprising a computer-readable medium and a computer program that is stored on the computer-readable medium and comprises program code for communication between vehicle-mounted communication equipment and a plurality of roadside units by transmitting vehicle communication messages between the vehicle-mounted communication equipment and the roadside units, which program code is suitable for the steps of the method according to the invention to be able to be carried out when the compute program is executed on a programmable device, in particular one that is part of the system, or on the vehicle or the vehicle-mounted communication equipment or on the roadside unit(s).

BACKGROUND

By using vehicle-to-vehicle communication mechanisms, new ways of exchanging data between various vehicles and between vehicles and other entities are provided, resulting in various advantages, such as a reduction in the number of hazardous situations, a reduction in the likeliness of congestion, an improvement in the ability to count traffic and/or to detect the use or the type of use of transport routes.

SUMMARY

In an exemplary embodiment, the present invention provides a method of communication between vehicle-mounted communication equipment or a vehicle and a plurality of roadside units by transmitting vehicle communication messages between the vehicle-mounted communication equipment or the vehicle and the plurality of roadside units, wherein the plurality of roadside units comprises at least a first roadside unit and a second roadside unit. The method includes the following steps: in a first step, a first vehicle communication message is transmitted from the first roadside unit to the vehicle-mounted communication equipment or to the vehicle, wherein the first vehicle communication message contains a first piece of token information; and in a second step, which follows the first step, a second vehicle communication message is transmitted from the vehicle-mounted communication equipment or the vehicle to a second roadside unit, wherein the second vehicle communication message either comprises the first piece of token information or wherein the second vehicle communication message comprises a second piece of token information that is generated or modified by the vehicle-mounted communication equipment or in the vehicle on the basis of the first piece of token information received previously.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Exemplary embodiments of the invention provide an optimized method of exchanging data between vehicle-mounted communication equipment for a vehicle and a plurality of roadside units.

In an exemplary embodiment, the invention provides a method of communication between vehicle-mounted communication equipment or a vehicle and a plurality of roadside units by transmitting vehicle communication messages between the vehicle-mounted communication equipment or the vehicle and the roadside units, wherein the plurality of roadside units comprises at least a first roadside unit and a second roadside unit, wherein the method comprises the following steps:

in a first step, a first vehicle communication message is transmitted from the first roadside unit to the vehicle-mounted communication equipment or to the vehicle, wherein the first vehicle communication message comprises a first piece of token information, in a second step, which follows the first step, a second vehicle communication message is transmitted from the vehicle-mounted communication equipment or the vehicle to a second roadside unit, wherein the second vehicle communication message either comprises the first piece of token information or wherein the second vehicle communication message comprises a second piece of token information that is generated or modified by the vehicle-mounted communication equipment or in the vehicle on the basis of the first piece of token information received previously.

According to the present invention, it is therefore advantageously possible to provide a method of communication between one or more vehicles (or vehicle-mounted communication equipment) and in particular a plurality of roadside units by transmitting vehicle communication messages. According to the invention, in a first step, a first vehicle communication message can be transmitted from the first roadside unit to the vehicle-mounted communication equipment or to the vehicle, the first vehicle communication message comprising a first piece of token information. As a result, the invention advantageously makes it possible for a piece of token information (for example a piece of token information comprising a piece of identification information relating to the first roadside unit and/or comprising a request to generate a second piece of token information) to be transmitted from the first roadside unit to the vehicle-mounted communication equipment or to the vehicle. The first vehicle communication message can, for example, advantageously be transmitted when the vehicle (or the vehicle-mounted communication equipment) is in the vicinity of the first roadside unit, in particular within a set radius around the first roadside unit. According to the invention, in a second step, which follows the first step, a second vehicle communication message can then be transmitted from the vehicle-mounted communication equipment or the vehicle to a second roadside unit, wherein the second vehicle communication message either comprises the first piece of token information or wherein the second vehicle communication message comprises a second piece of token information that is generated or modified by the vehicle-mounted communication equipment or in the vehicle on the basis of the first piece of token information received previously. It is thereby advantageously possible for the second piece of token information to be generated on the basis of the first piece of token information, i.e. also comprises a piece of information contained in the first piece of token information (for example a piece of information relating to the identity of the first roadside unit, and in particular also further, additional information, for example a piece of token information comprising a piece of identification information relating to the second roadside unit and/or comprising information relating to the time at which the first vehicle communication message is transmitted). However, it is also possible for the second piece of token information to merely be generated by a request contained in the first piece of token information and to otherwise not contain any of the first token information. The second vehicle communication message can advantageously be transmitted, for example, when the vehicle (or the vehicle-mounted communication equipment) is in the vicinity of the second roadside unit, in particular within a pre-set radius around the second roadside unit. Therefore, it is in particular possible for the vehicle to have moved along a stretch/road/route between the first roadside unit and the second roadside unit, in particular towards the second roadside unit, after the first vehicle communication message has been received and before the second vehicle communication message is sent. For example, the method according to the invention makes it possible for the vehicle (or the vehicle-mounted communication equipment) to pass a piece of token information (and possibly supplement it with further information) from a first roadside unit to a second roadside unit. It is therefore possible, for example, for the second roadside unit to acquire information relating to the time and to the location of the vehicle or the vehicle-mounted communication equipment during transmission of the first vehicle communication message, and for information relating to the time and to the location (of the vehicle or vehicle-mounted communication equipment) to also be generated/acquired/stored during transmission of the second vehicle communication message, so that the average speed of the vehicle between the first roadside unit and the second roadside unit can be identified, for example, in particular by an operator of the roadside units or an entity that has access to the token information or data from the roadside units (and information relating to potential speeding offences by the vehicle can thereby be acquired, for example). It is also possible for some or all of the roadside units to be able to write and read out the token information and to be able to pass the data recorded (or read out from the token information) to a central recording and/or evaluation unit. The method according to the invention makes it possible, for example, to improve/individualize the ways of imposing a toll, to improve the measurement of the volume of traffic and to improve the ways of recording motoring offences.

According to one embodiment of the present invention, in addition to the at least first and second roadside units, the plurality of roadside units comprises a third roadside unit, the second vehicle communication message being transmitted in the second step from the vehicle-mounted communication equipment or the vehicle to the third roadside unit instead of to the second roadside unit.

According to one embodiment of the invention, it is thereby possible for the plurality of roadside units to comprise a third roadside unit in addition to the at least first and second roadside units. In this case, in the second step, the second vehicle communication message can be transmitted from the vehicle-mounted communication equipment or the vehicle to the third roadside unit instead of to the second roadside unit. It is therefore possible, for example, to advantageously use one embodiment of the invention for crossroads and forks in the road, the second roadside unit being located on a first road/stretch/route after the fork and the third roadside unit being located on a second road/stretch/route after the fork and the first roadside unit being located on the road/stretch/route in front of the fork in order to acquire additional details relating to traffic flows, for example the number (and/or type) of vehicles using the first or second roads/stretches/routes.

According to one embodiment of the present invention, in the second step,
in addition to the first piece of token information or
in addition to or as part of the second piece of token information, at least a further piece of information is transmitted from the vehicle-mounted communication equipment or the vehicle to the second roadside unit or to the third roadside unit as part of the second vehicle communication message, the further piece of information comprising at least one of the following pieces of information:

a piece of geographic coordinate information relating to the vehicle, a piece of geographic coordinate information relating to the vehicle and to a piece of time information, a piece of geographic coordinate information relating to the vehicle and also a piece of time information relating to the geographic coordinate information, a piece of geographic coordinate information relating to the vehicle and to the point at which the first vehicle communication message is received or processed, and in particular also a piece of time information relating to the point at which the first vehicle communication message is received or processed, or a piece of geographic coordinate information relating to the vehicle and to the point at which the second vehicle communication message is processed or sent, and in particular also a piece of time information relating to the point at which the second vehicle communication message is processed or sent, the first and/or the second step in particular being carried out on the basis of a piece of heading information transmitted from the vehicle-mounted communication equipment or the vehicle, and/or on the basis of a piece of velocity information transmitted from the vehicle-mounted communication equipment or the vehicle or detected by the first roadside unit.

According to different embodiments of the invention (or variants of the invention), it is thereby possible, in the second step, for at least a further piece of information to be transmitted as part of the second vehicle communication message from the vehicle-mounted communication equipment or the vehicle to the second roadside unit or to the third roadside unit in addition to the first piece of token information, or in addition to or as part of the second piece of token information.

In conjunction with such variants according to the invention, the further piece of information in particular comprises a piece of geographic coordinate information relating to the vehicle, and/or a piece of geographic coordinate information relating to the vehicle and to a piece of time information, and/or a piece of geographic coordinate information relating to the vehicle, and also a piece of time information relating to the geographic coordinate information, and/or a piece of geographic coordinate information relating to the vehicle and to the point at which the first vehicle communication message is received or processed, and in particular also a piece of time information relating to the point at which the first vehicle communication message is received or processed. According to another variant of the invention, the further piece of information alternatively or additionally comprises a piece of geographic coordinate information relating to the vehicle and to the point at which the second vehicle communication message is processed or sent, and in particular also comprises a piece of time information relating to the point at which the second vehicle communication message is processed or sent.

In this case, it is possible for the geographic coordinate information relating to the vehicle to be in particular a piece of geographic coordinate information that indicates the location of the vehicle, in particular at a specific point in time, such as the point at which the first vehicle communication message is received or processed, and/or the point at which the second vehicle communication message is processed or sent. In this case, it is also possible for a piece of geographic coordinate information to be provided for example by a Global Positioning System (GPS)-enabled element that is associated with the vehicle (or arranged on the vehicle) (or for the vehicle-mounted communication equipment to be able to read out a piece of geographic coordinate information from such a Global Positioning System (GPS)-enabled element). It is also possible for the vehicle-mounted communication equipment itself to be GPS-enabled. In this case, it is in particular also possible for the further piece of information to contain information used to identify the vehicle (for example a piece of information relating to the motor vehicle registration number or identification information used to identify a vehicle or vehicle-mounted communication equipment).

As a result, it is also possible for a piece of velocity information (for example the average speed of the vehicle, in particular for (or based on) the stretch covered between the first vehicle communication message (being received) and the second vehicle communication message (being sent)) to be identified on the basis of the time information and geographic coordinate information contained in the further piece of information, in particular via the second roadside unit or an operator of the roadside units or an entity that can access the further piece of information once it has been transmitted to the second roadside unit, or via the vehicle-mounted communication equipment itself As a result, in particular the first and/or the second step can be carried out on the basis of a piece of heading information transmitted from the vehicle-mounted communication equipment or the vehicle (in particular as part of the further piece of information) and/or on the basis of a piece of velocity information that is transmitted from the vehicle-mounted communication equipment or the vehicle or is detected/identified by the first roadside unit.

According to one embodiment of the present invention, the first piece of token information, which is transmitted as part of the first vehicle communication message transmitted from the first roadside unit to the vehicle-mounted communication equipment or the vehicle in the first step, merely comprises or is a request to generate the second piece of token information.

According to one embodiment of the present invention, in a third step, which follows the first step and precedes the second step, a third vehicle communication message is transmitted from the vehicle-mounted communication equipment or the vehicle to the first roadside unit or to the second roadside unit or to the third roadside unit, the third vehicle communication message confirming that the first piece of token information has been received.

As a result, according to one embodiment of the invention, it is advantageously possible for the vehicle-mounted communication equipment or the vehicle to inform the first and/or second and/or third roadside unit, via a third vehicle communication message, that the first piece of token information has been received by the vehicle-mounted communication equipment or the vehicle. This can ensure that the first piece of token information has actually been transmitted, which is helpful for counting the number of vehicles along a specific route or for calculating tolls in toll systems, for example.

According to one embodiment of the present invention, in a fourth step, which precedes the first step, a fourth vehicle communication message is transmitted from the vehicle-mounted communication equipment or the vehicle to the first roadside unit, a unique piece of identification information relating to the vehicle-mounted communication equipment or the vehicle or a unique piece of identification information relating to the vehicle classification of the vehicle being transmitted to the first roadside unit via the fourth vehicle communication message.

As a result, according to one embodiment of the invention, it is advantageously possible for a unique piece of identification information relating to the vehicle-mounted communication equipment or to the vehicle or for a unique piece of identification information relating to the vehicle classification of the vehicle to be transmitted to the first roadside unit, even before the first piece of token information is transmitted to the vehicle-mounted communication equipment or to the vehicle and in particular before the first piece of token information is generated. As a result, the first piece of token information can be generated or transmitted on the basis of the unique piece of identification information. This is particularly useful, for example, in toll systems in which different tolls are assigned to different vehicle models. This is, for example, also advantageous for accurately recording the type of vehicles that use a specific stretch, which can be used to draw advantageous conclusions regarding future traffic control or possible congestion or the like. Furthermore, individual pieces of first token information can therefore be transmitted/generated (by the first roadside unit) which make it possible to accurately identify the vehicle or the vehicle-mounted communication equipment. As a result, according to one embodiment of the present invention, for example an established piece of geographic coordinate information or an established speed can be assigned to a specific vehicle or specific vehicle-mounted communication equipment, which may be helpful when establishing/assigning speeding offences, for example. As a result, it is also possible, for example, to record at which point in the day a specific road/stretch/route, on which (or near which) the first and the second roadside units are installed, is used by a vehicle or vehicle-mounted communication equipment (which can be identified by the identification information). Such information can, for example, be used to determine time-of-day-dependent toll charges (for use on this specific stretch or route) for the vehicle. Furthermore, according to one embodiment of the present invention, individual insurance fees for a vehicle/vehicle owner can be identified, for example; it being possible for the insurance fees to be dependent on the use of specific routes/stretches/roads or on the use of specific routes/stretches/roads at specific times of day.

According to one embodiment of the present invention, in a fifth step, which follows the first step and precedes the second step, a fifth vehicle communication message is transmitted from the second roadside unit or from the third roadside unit to the vehicle-mounted communication equipment or the vehicle, the fifth vehicle communication message prompting or requesting the transmission of the second vehicle communication message from the vehicle-mounted communication equipment or the vehicle to the second roadside unit or to the third roadside unit.

As a result, the invention makes it possible for the vehicle or the vehicle-mounted communication equipment to acquire a piece of information (for example a piece of trigger information) from the second or third roadside unit as part of the fifth vehicle communication message, so that the vehicle or the vehicle-mounted communication equipment is prompted to begin the process of creating/transmitting the second vehicle communication message.

According to one embodiment of the present invention, the second piece of token information and/or the at least one further piece of information is/are used to collect one or more of the following items of data:

the number of vehicles passing the first roadside unit and the second roadside unit and/or the number of vehicles passing the first roadside unit and the third roadside unit;

the average speed of the vehicle between the geographic coordinate information relating to the vehicle and to the point at which the first vehicle communication message is received or processed, and the geographic coordinate information relating to the vehicle and to the point at which the second vehicle communication message is processed or sent; and/or the vehicle communication messages are provided as collision avoidance messages—in particular according to the PC5 interface definition—inside a communication system according to the LTE-V (long term evolution vehicle communication) standard and/or a comparable message according to the IEEE 802.11p standard.

Furthermore, in an exemplary embodiment, the invention provides a system for communication between vehicle-mounted communication equipment or a vehicle and a plurality of roadside units by transmitting vehicle communication messages between the vehicle-mounted communication equipment or the vehicle and the roadside units, wherein the plurality of roadside units comprises at least a first roadside unit and a second roadside unit, and wherein the system comprises at least the vehicle and the plurality of roadside units, wherein the system is configured such that:

a first vehicle communication message is transmitted from the first roadside unit to the vehicle-mounted communication equipment or to the vehicle, wherein the first vehicle communication message comprises a first piece of token information, and a second vehicle communication message is transmitted from the vehicle-mounted communication equipment or the vehicle to a second roadside unit, wherein the second vehicle communication message either comprises the first piece of token information or wherein the second vehicle communication message comprises a second piece of token information that is generated or modified by or in the vehicle-mounted communication equipment.

The present invention therefore advantageously makes it possible to provide a system for communication between one or more vehicles (or vehicle-mounted communication equipment) and in particular a plurality of roadside units by transmitting vehicle communication messages. According to the invention, in a first step, a first vehicle communication message can be transmitted from the first roadside unit to the vehicle-mounted communication equipment or to the vehicle, the first vehicle communication message comprising a first piece of token information. As a result, the invention advantageously makes it possible for a piece of token information (for example a piece of token information that comprises a piece of identification information relating to the first roadside unit and/or comprises a request to generate a second piece of token information) to be transmitted from the first roadside unit to the vehicle-mounted communication equipment or to the vehicle. The first vehicle communication message can advantageously be transmitted, for example, when the vehicle (or the vehicle-mounted communication equipment) is in the vicinity of the first roadside unit, in particular within a set radius around the first roadside unit. According to the invention, in a second step, which follows the first step, a second vehicle communication message can then be transmitted from the vehicle-mounted communication equipment or the vehicle to a second roadside unit, wherein the second vehicle communication message either comprises the first piece of token information or wherein the second vehicle communication message comprises a second piece of token information that is generated or modified by the vehicle-mounted communication equipment or in the vehicle on the basis of the first token information received previously. It is thus advantageously possible for the second piece of token information to be generated on the basis of the first piece of token information, i.e. also comprises a piece of information contained in the first piece of token information (for example a piece of information relating to the identity of the first roadside unit), for example (and in particular also further additional information such as token information, which comprises identification information relating to the second roadside unit and/or which comprises information relating to the point at which the first vehicle communication message is transmitted). However, it is also possible for the second piece of token information to merely be generated by a request contained in the first piece of token information and to otherwise not contain any of the first token information. The second vehicle communication message can, for example, advantageously be transmitted when the vehicle (or the vehicle-mounted communication equipment) is in the vicinity of the second roadside unit, in particular within a pre-set radius around the second roadside unit. It is therefore possible in particular for the vehicle to have moved along a stretch/road/route between the first roadside unit and the second roadside unit, in particular towards the second roadside unit, after the first vehicle communication message has been received and before the second vehicle communication message has been sent. The system according to the invention makes it possible, for example, for the vehicle (or the vehicle-mounted communication equipment) to pass a piece of token information (and possibly supplement it with further information) from a first roadside unit to a second roadside unit. It is therefore possible, for example, for the second roadside unit to acquire information relating to the time and to the location of the vehicle or the vehicle-mounted communication equipment during transmission of the first vehicle communication message and to also generate/acquire/store information relating to the time and to the location (of the vehicle or the vehicle-mounted communication equipment) during transmission of the second vehicle communication message, so that the average speed of the vehicle between the first roadside unit and the second roadside unit can be determined, for example, in particular by an operator of the roadside units or an entity that has access to the token information or data from the roadside units (and information about potential speeding offences by the vehicle can thereby be acquired, for example). It is also possible for some or all of the roadside units to be able to write and read out the token information and to be able to pass the data recorded (read out from the token information) to a central recording and/or evaluation unit. As a result of the system according to the invention, it is possible to improve/individualize the ways of imposing a toll, to improve the measurement of the volume of traffic and to improve the ways of recording motoring offences, for example.

According to one embodiment of the present invention, the plurality of roadside units comprises a third roadside unit in addition to the at least first and second roadside units, the second vehicle communication message being transmitted from the vehicle-mounted communication equipment or the vehicle to the third roadside unit instead of to the second roadside unit.

In an exemplary embodiment, the invention provides a roadside unit for communication between vehicle-mounted communication equipment or a vehicle and a plurality of roadside units by transmitting vehicle communication messages between the vehicle-mounted communication equipment or the vehicle and the roadside units, wherein the roadside unit is suitable for use in a system according to one embodiment of the present invention or in a method according to one embodiment of the present invention.

In an exemplary embodiment, the invention provides vehicle-mounted communication equipment for a vehicle for communication between the vehicle-mounted communication equipment and a plurality of roadside units by transmitting vehicle communication messages between the vehicle-mounted communication equipment and the roadside units, wherein the vehicle and/or the vehicle-mounted communication equipment of the vehicle is suitable for use in a system according to one embodiment of the present invention or in a method according to one embodiment of the present invention.

In an exemplary embodiment, the invention provides a computer program comprising program code, which is used to carry out the steps of a method according to one embodiment of the invention when the computer program is executed on a programmable device, in particular one that is part of the system, or on the vehicle or the vehicle-mounted communication equipment or on the roadside unit(s), or when the computer program is executed in part on the vehicle or the vehicle-mounted communication equipment and in part on the roadside unit(s).

In an exemplary embodiment, the invention provides a computer program product comprising a computer-readable medium and a computer program that is stored on the computer-readable medium and comprises program code for communication between vehicle-mounted communication equipment and a plurality of roadside units by transmitting vehicle communication messages between the vehicle-mounted communication equipment and the roadside units, which program code is suitable for the steps of a method according to one embodiment of the present invention to be able to be carried out when the computer program is executed on a programmable device, in particular one that is part of the system, or on the vehicle or the vehicle-mounted communication equipment or on the roadside unit(s), or when the computer program is executed in part on the vehicle or the vehicle-mounted communication equipment and in part on the roadside unit(s).

Further details, features and advantages of the invention can be found in the drawings and in the following description of preferred embodiments with reference to the drawings. The drawings merely show exemplary embodiments of the invention that do not limit the essential concept of the invention.

Identical parts are provided with identical reference numerals in the various figures, and are therefore generally also only named or mentioned once in each case.

Figure 1:
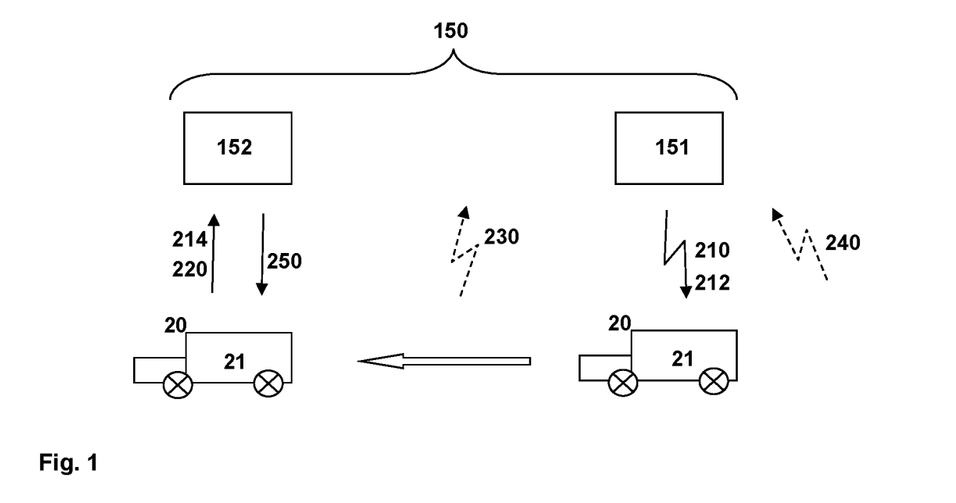
FIG. 1 is a schematic view of an exemplary embodiment of the present invention.

FIG. 1 is a schematic view of an exemplary embodiment of the present invention. Said figure shows a first roadside unit 151 of a plurality of roadside units 150, and a second roadside unit 152 of the plurality of roadside units 150, and a vehicle 21, which comprises vehicle-mounted communication equipment 20. The vehicle 21 moves at least from a region near the first roadside unit 151 (for example from a region within a pre-defined radius around the first roadside unit 151) and into a region near the second roadside unit 152 (for example from a region within a predefined radius around the second roadside unit 152). Said movement of the vehicle 21 in the embodiment of the method according to the invention is shown schematically in FIG. 1 by a broad arrow that is not filled in (bottom-middle region of the figure), i.e. that the vehicle 21 and the vehicle-mounted communication equipment 20 move from right to left in FIG. 1 in the embodiment of the method according to the invention. In an optional fourth step, a fourth vehicle communication message 240 is transmitted from the vehicle-mounted communication equipment 20 or the vehicle 21 to the first roadside unit 151. The optional fourth vehicle communication message 240 contains a unique piece of information relating to the vehicle-mounted communication equipment 20 (for example a piece of information about an identification number/serial number of the vehicle-mounted communication equipment 20) or of the vehicle 21 (for example information about the motor vehicle registration number of the vehicle 21) or unique identification information relating to the vehicle classification of the vehicle 21. In a first step, which follows the optional fourth step, a first vehicle communication message 210 is transmitted from the first roadside unit 151 to the vehicle-mounted communication equipment 20 or to the vehicle 21. Said first vehicle communication message 210 comprises a first piece of token information 212. Such a first piece of token information 212 is therefore generated before the first vehicle communication message 210 is transmitted from the roadside unit 151 (or another entity associated therewith), in particular on the basis of the optional fourth vehicle communication message 240 acquired previously and/or on the basis of information that has been transmitted to the first roadside unit 151 via the optional fourth vehicle communication message 240. In an optional third step, an optional third vehicle communication message 230 is transmitted from the vehicle-mounted communication equipment 20 or the vehicle 21 to the first roadside unit 151 or to the second roadside unit 152. The optional third vehicle communication message 230 confirms that the first piece of token information 212 has been received (by the vehicle-mounted communication equipment 20 or the vehicle 21). Such a third vehicle communication message 230 can be transmitted to the first and/or second roadside unit 151, 152, in particular when the first and the second roadside units 151, 152 are connected to one another and/or communication is possible between the first and the second roadside units 151, 152 and an additional entity, for example an operator of the first and the second roadside units 151, 152. During/after the receipt of the first vehicle communication message 210 and/or during/after the sending of the third vehicle communication message 230 by the vehicle 21 or the vehicle-mounted communication equipment 20, the vehicle 21 moves further along a road and away from the first roadside unit 151. In an optional fifth step, which is carried out before, during and/or after the optional third step (i.e. in particular at a later time than the first step), an optional fifth vehicle communication message 250 is transmitted from the second roadside unit 152 to the vehicle-mounted communication equipment 20 or to the vehicle 21. On account of the fifth vehicle communication message 250, the transmission of the second vehicle communication message 220 from the vehicle-mounted communication equipment 20 or the vehicle 21 to the second roadside unit 152 in a second step is brought about or requested. In a second step, which takes place after the first step and in particular after the optional fifth step, a second vehicle communication message 220 is transmitted from the vehicle-mounted communication equipment 20 or the vehicle 21 to the second roadside unit 152. In this case, the second vehicle communication message 220 either comprises the first piece of token information 212 and/or the second vehicle communication message 220 comprises a second piece of token information 214 that is generated or modified by the vehicle-mounted communication equipment 20 or in the vehicle 21 on the basis of the first piece of token information 212 received previously. In addition to the first piece of token information 212 or in addition to or as part of the second piece of token information 214, at least a further piece of information is optionally transmitted, in the second step, from the vehicle-mounted communication equipment 20 or the vehicle 21 to the second roadside unit 152 as part of the second vehicle communication message 220. The further piece of information comprises at least one piece of geographic coordinate information relating to the vehicle 21, one piece of geographic coordinate information relating to the vehicle 21 and to a piece of time information, one piece of geographic coordinate information relating to the vehicle 21 and also one piece of time information relating to the geographic coordinate information, one piece of geographic coordinate information relating to the vehicle 21 and to the point at which the first vehicle communication message 210 is received or processed, and in particular also one piece of time information relating to the point at which the first vehicle communication message 210 is received or processed, one piece of geographic coordinate information relating to the vehicle 21 and to the point at which the second vehicle communication message 220 is processed or sent, and in particular also one piece of time information relating to the point at which the second vehicle communication message 220 is processed or sent. As a result, it is possible for example to track/identify/determine which route/stretch/road between the first roadside unit 151 and the second roadside unit 152 a vehicle 21 takes. In particular, after the second vehicle communication message 220 has been transmitted, the average speed of the vehicle 21 on the route (stretch) between the first roadside unit 151 and a second roadside unit 152 is preferably identified (on the basis of the geographic coordinate information that is transmitted via the second vehicle communication message and relates to the vehicle 21 and to a piece of time information) by the second roadside unit 151 or by an entity that has access to the data from the second roadside unit 152, in particular to the second piece of token information 214 and/or the further piece of information.

Figure 2:
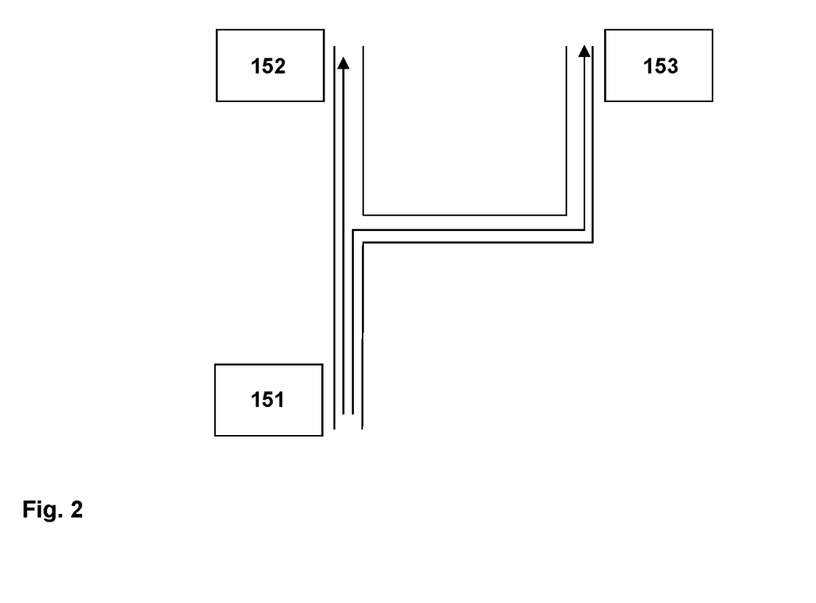
FIG. 2 is a schematic view of another exemplary embodiment of the present invention comprising first, second and third roadside units.

FIG. 2 schematically shows another exemplary embodiment of the present invention. In this figure, a first roadside unit 151, a second roadside unit 152 and a third roadside unit 153 are shown. The first, the second and the third roadside units 151, 152, 153 are located near a road network that comprises a fork. The two arrows indicate possible routes for vehicles. By taking a first route (corresponding to the left-hand arrow in FIG. 2), a first vehicle can therefore move from a region of the road near the first roadside unit 151 and into a region near the second roadside unit 152. By taking a second route (corresponding to the right-hand arrow in FIG. 2), a second vehicle can therefore move from a region of the road near the first roadside unit 151 and into a region near the third roadside unit 153. According to one embodiment of the present invention, it is possible for an entity that has access to the data from the second roadside unit 152, for example, to establish, in particular after the second vehicle communication message 220 has been received by the second roadside unit 152 (see also FIG. 1), that the first vehicle has taken the first route (between the first and the second roadside units 151, 152). According to one embodiment of the present invention, it is possible for an entity that has access to the data from the third roadside unit 153, for example, to establish, in particular after the second vehicle communication message 220 has been received by the third roadside unit 153 (see also FIG. 1, where the second roadside unit 152 is replaced with the third roadside unit 153 in all possible steps), that the second vehicle has taken the second route (between the first and the third roadside unit 151, 153). This method can be repeated for any number of vehicles, making it possible to identify how many vehicles (and in particular which vehicles and/or types of vehicles and how many thereof) take the first or second route within a predefined time period, for example.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method of communication between vehicle-mounted communication equipment or a vehicle and a plurality of roadside units by transmitting vehicle communication messages between the vehicle-mounted communication equipment or the vehicle and the plurality of roadside units, wherein the plurality of roadside units comprises at least a first roadside unit and a second roadside unit, wherein the method comprises the following steps:

in a fourth step, a fourth vehicle communication message is transmitted from the vehicle-mounted communication equipment or the vehicle to the first roadside unit, wherein the fourth vehicle message comprises a unique piece of identification information relating to: the vehicle-mounted communication equipment, the vehicle, or a vehicle classification of the vehicle;

in a first step, which follows the fourth step, a first vehicle communication message is transmitted from the first roadside unit to the vehicle-mounted communication equipment or to the vehicle, wherein the first vehicle communication message contains a first piece of token information, wherein the first piece of token information is generated based on the unique piece of identification information;

in a third step, which follows the first step, a third vehicle communication message is transmitted from the vehicle-mounted communication equipment or the vehicle to the first roadside unit or to the second roadside unit, the third vehicle communication message confirming that the first piece of token information has been received; and in a second step, which follows the third step, a second vehicle communication message is transmitted from the vehicle-mounted communication equipment or the vehicle to the second roadside unit, wherein the second vehicle communication message comprises a second piece of token information that is generated or modified by the vehicle-mounted communication equipment or in the vehicle on the basis of the first piece of token information received previously;

wherein the second piece of token information is used to collect a number of vehicles passing the first roadside unit and the second roadside unit;

wherein the first through fourth steps are repeated to identify which types of vehicles and how many thereof take a first route within a predefined time period, wherein the first route corresponds to moving from a region of road near the first roadside unit to a region of road near the second roadside unit.

2. The method according to claim 1, wherein the plurality of roadside units further comprises a third roadside unit.

3. The method according to claim 1, wherein, in the second step, in addition to the first piece of token information or in addition to or as part of the second piece of token information, at least one further piece of information is transmitted from the vehicle-mounted communication equipment or the vehicle to the second roadside unit as part of the second vehicle communication message, the at least one further piece of information comprising:

a piece of geographic coordinate information relating to the vehicle;

a piece of geographic coordinate information relating to the vehicle and to a piece of time information;

a piece of geographic coordinate information relating to the vehicle and also a piece of time information relating to the geographic coordinate information;

a piece of geographic coordinate information relating to the vehicle and to the point at which the first vehicle communication message is received or processed, and also a piece of time information relating to the point at which the first vehicle communication message is received or processed; and/or a piece of geographic coordinate information relating to the vehicle and to the point at which the second vehicle communication message is processed or sent and also a piece of time information relating to the point at which the second vehicle communication message is processed or sent;

wherein the first and/or the second steps are carried out on the basis of a piece of heading information transmitted from the vehicle-mounted communication equipment or the vehicle and/or on the basis of a piece of velocity information transmitted from the vehicle-mounted communication equipment or the vehicle or detected by the first roadside unit.

4. The method according to claim 1, wherein the first piece of token information comprises a request to generate the second piece of token information.

5. The method according to claim 1, wherein, in a fifth step, which follows the first step and precedes the second step, a fifth vehicle communication message is transmitted from the second roadside unit to the vehicle-mounted communication equipment or the vehicle, the fifth vehicle communication message prompting or requesting the transmission of the second vehicle communication message from the vehicle communication equipment or the vehicle to the second roadside unit.

6. The method according to claim 3, wherein the second piece of token information is further used to collect the average speed of the vehicle between the geographic coordinate information relating to the vehicle and to the point at which the first vehicle communication message is received or processed, and the geographic coordinate information relating to the vehicle and to the point at which the second vehicle communication message is processed or sent; and/or
    wherein the at least one further piece of information is used to collect one or more of the following items of data:
        the number of vehicles passing the first roadside unit and the second roadside unit; and/or
        the average speed of the vehicle between the geographic coordinate information relating to the vehicle and to the point at which the first vehicle communication message is received or processed, and the geographic coordinate information relating to the vehicle and to the point at which the second vehicle communication message is processed or sent.

7. The method according to claim 1, wherein the vehicle communication messages are provided as collision avoidance messages according to the PC5 interface definition inside a communication system according to the Long-Term Evolution Vehicle Communication (LTE-V) standard and/or collision avoidance messages according to the IEEE 802.11p standard.

8. A system, comprising:
vehicle-mounted communication equipment or a vehicle; and
a plurality of roadside units;
wherein the vehicle-mounted communication equipment or the vehicle and the plurality of roadside units are configured to transmit vehicle communication messages;
wherein the plurality of roadside units comprises at least a first roadside unit and a second roadside unit;
wherein the first roadside unit is configured to transmit a first vehicle communication message to the vehicle-mounted communication equipment or to the vehicle, wherein the first vehicle communication message comprises a first piece of token information;
wherein the vehicle-mounted communication equipment or the vehicle is configured to:
    transmit a third vehicle communication message to the first roadside unit or to the second roadside unit confirming that the first piece of token information has been received; and
    transmit a second vehicle communication message to the second roadside unit, wherein the second vehicle communication message comprises a second piece of token information that is generated or modified by or in the vehicle-mounted communication equipment or the vehicle;
wherein the vehicle-mounted communication equipment or the vehicle is further configured to transmit a fourth vehicle communication message to the first roadside unit, wherein the fourth vehicle message comprises a unique piece of identification information relating to: the vehicle-mounted communication equipment, the vehicle, or a vehicle classification of the vehicle;
wherein the first piece of token information is generated based on the unique piece of identification information;
wherein the second piece of token information is usable to collect a number of vehicles passing the first roadside unit and the second roadside unit;
wherein respective second pieces of token information from a plurality of vehicle-mounted communication equipment or vehicles are usable to identify which types of vehicles and how many thereof take a first route within a predefined time period, wherein the first route corresponds to moving from a region of road near the first roadside unit to a region of road near the second roadside unit.

9. The system according to claim 8, wherein the plurality of roadside units further comprises a third roadside unit.

10. One or more non-transitory computer-readable mediums having processor-executable instructions stored thereon for communication between vehicle-mounted communication equipment or a vehicle and a plurality of roadside units by transmitting vehicle communication messages between the vehicle-mounted communication equipment or the vehicle and the plurality of roadside units, wherein the plurality of roadside units comprises at least a first roadside unit and a second roadside unit, wherein the processor-executable instructions, when executed, facilitate performance of the following steps:
in a fourth step, a fourth vehicle communication message is transmitted from the vehicle-mounted communication equipment or the vehicle to the first roadside unit, wherein the fourth vehicle message comprises a unique piece of identification information relating to: the vehicle-mounted communication equipment, the vehicle, or a vehicle classification of the vehicle;
in a first step, which follows the fourth step, a first vehicle communication message is transmitted from the first roadside unit to the vehicle-mounted communication equipment or to the vehicle, wherein the first vehicle communication message contains a first piece of token information, wherein the first piece of token information is generated based on the unique piece of identification information;
in a third step, which follows the first step, a third vehicle communication message is transmitted from the vehicle-mounted communication equipment or the vehicle to the first roadside unit or to the second roadside unit, the third vehicle communication message confirming that the first piece of token information has been received; and
in a second step, which follows the third step, a second vehicle communication message is transmitted from the vehicle-mounted communication equipment or the vehicle to the second roadside unit, wherein the second vehicle communication message comprises a second piece of token information that is generated or modified by the vehicle-mounted communication equipment or in the vehicle on the basis of the first piece of token information received previously;
wherein the second piece of token information is usable to collect a number of vehicles passing the first roadside unit and the second roadside unit;
wherein the first through fourth steps are repeatable to identify which types of vehicles and how many thereof take a first route within a predefined time period, wherein the first route corresponds to moving from a region of road near the first roadside unit to a region of road near the second roadside unit.

11. The method according to claim 1, wherein the first piece of token information comprises a piece of identification information relating to the first roadside unit.

12. The method according to claim 1, wherein the first vehicle communication message is transmitted from the first roadside unit to the vehicle-mounted communication equipment or to the vehicle while the vehicle-mounted communication equipment or the vehicle is within a preset radius around the first roadside unit.

13. The method according to claim 1, wherein the second piece of token information comprises a piece of identification information relating to the second roadside unit and/or comprising information relating to the time at which the first vehicle communication message is transmitted.

14. The method according to claim 1, wherein the second vehicle communication message is transmitted from the vehicle-mounted communication equipment or the vehicle to the second roadside unit while the vehicle-mounted communication equipment or the vehicle is within a preset radius around the second roadside unit.

\* \* \* \* \*